United States Patent
Pachkov et al.

(10) Patent No.: US 10,528,512 B1
(45) Date of Patent: Jan. 7, 2020

(54) IMPROVING EFFICIENCY OF ASYNCHRONOUS INPUT/OUTPUT OPERATIONS BASED ON OBSERVED PERFORMANCE

(71) Applicant: Parallels International GmbH, Schaffhausen (CH)

(72) Inventors: Sergey Pachkov, Moscow (RU); Nikolay Dobrovolskiy, Moscow (RU); Serguei M. Beloussov, Singapore (SG)

(73) Assignee: Parallels International GmbH, Schaffhausen (CH)

( * ) Notice: Subject to any disclaimer, the term of this patent is extended or adjusted under 35 U.S.C. 154(b) by 0 days.

(21) Appl. No.: 15/921,091

(22) Filed: Mar. 14, 2018

(51) Int. Cl.
  *G06F 13/40* (2006.01)
  *G06F 11/34* (2006.01)
  *G06F 11/30* (2006.01)

(52) U.S. Cl.
  CPC ...... *G06F 13/4068* (2013.01); *G06F 11/3027* (2013.01); *G06F 11/349* (2013.01)

(58) Field of Classification Search
  CPC combination set(s) only.
  See application file for complete search history.

(56) References Cited

U.S. PATENT DOCUMENTS

| | | | | |
|---|---|---|---|---|
| 6,208,954 B1* | 3/2001 | Houtchens | .......... | G06F 17/5022 703/16 |
| 6,212,572 B1* | 4/2001 | Aydin | .......... | G06F 9/544 719/312 |
| 2008/0104025 A1* | 5/2008 | Dharamshi | .......... | G06F 16/986 |
| 2008/0172445 A1* | 7/2008 | Zaidelson | .......... | G06Q 10/10 709/201 |
| 2013/0024875 A1* | 1/2013 | Wang | .......... | G06F 13/22 719/318 |
| 2015/0271294 A1* | 9/2015 | Ma | .......... | H04W 12/08 709/203 |

OTHER PUBLICATIONS

Linux/UNIX system programming training, http://man7.org/linux/man-pages/man2/select.2.html, 9 pages, [retrieved from the internet on Jul. 19, 2018].

* cited by examiner

*Primary Examiner* — Raymond N Phan
(74) *Attorney, Agent, or Firm* — Lowenstein Sandler LLP

(57) ABSTRACT

Systems and methods for performing asynchronous input/output (I/O) operations. An example method comprises: initializing a list of sockets that are ready for performing I/O operations; traversing the list of sockets, wherein a traversal operation of the list includes, for each socket referenced by the list: performing I/O operations using the socket, updating a state flag associated with the socket to reflect a state of the socket, updating one or more observed I/O performance statistics of the socket; and responsive to detecting less than a threshold number of I/O operation errors during the traversal operation, updating the list of sockets based on updated endpoint state flags and observed I/O performance statistics.

20 Claims, 6 Drawing Sheets

|  |  |  |  |  |
|---|---|---|---|---|
| State <u>220A</u> | Timer <u>230A</u> | Amount of Rx/Tx data <u>240A</u> | Rx/Tx data rate <u>250A</u> | . . . |
| State <u>220B</u> | Timer <u>230B</u> | Amount of Rx/Tx data <u>240B</u> | Rx/Tx data rate <u>250B</u> | . . . |
|  | . . . |  |  |  |
|  | . . . |  |  |  |
| State <u>220N</u> | Timer <u>230N</u> | Amount of Rx/Tx data <u>240N</u> | Rx/Tx data rate <u>250N</u> | . . . |

IMPROVING EFFICIENCY OF ASYNCHRONOUS INPUT/OUTPUT OPERATIONS BASED ON OBSERVED PERFORMANCE

TECHNICAL FIELD

The present disclosure is generally related to computer systems, and is specifically related to systems and methods for improving efficiency of asynchronous input/output operations.

BACKGROUND

A process running on a computer system may receive data from multiple sources and/or send data to multiple destinations. Conceptually, means for implementing these input/output operations may be represented by an abstract model of a communication channel (e.g., implemented by a Transmission Control Protocol (TCP) connection or a sequence of User Datagram Protocol (UDP) datagrams) which on both sides is terminated by communication endpoints (referred to as sockets). A socket, addressable by a file descriptor, may be utilized for receiving and/or transmitting data.

BRIEF DESCRIPTION OF THE DRAWINGS

The present disclosure is illustrated by way of examples, and not by way of limitation, and may be more fully understood with references to the following detailed description when considered in connection with the figures, in which:

FIG. 2 schematically illustrates example memory data structure storing statistics characterizing the observed I/O performance of the sockets maintained by a server operating in accordance with one or more aspects of the present disclosure;

DETAILED DESCRIPTION

Figure 1:
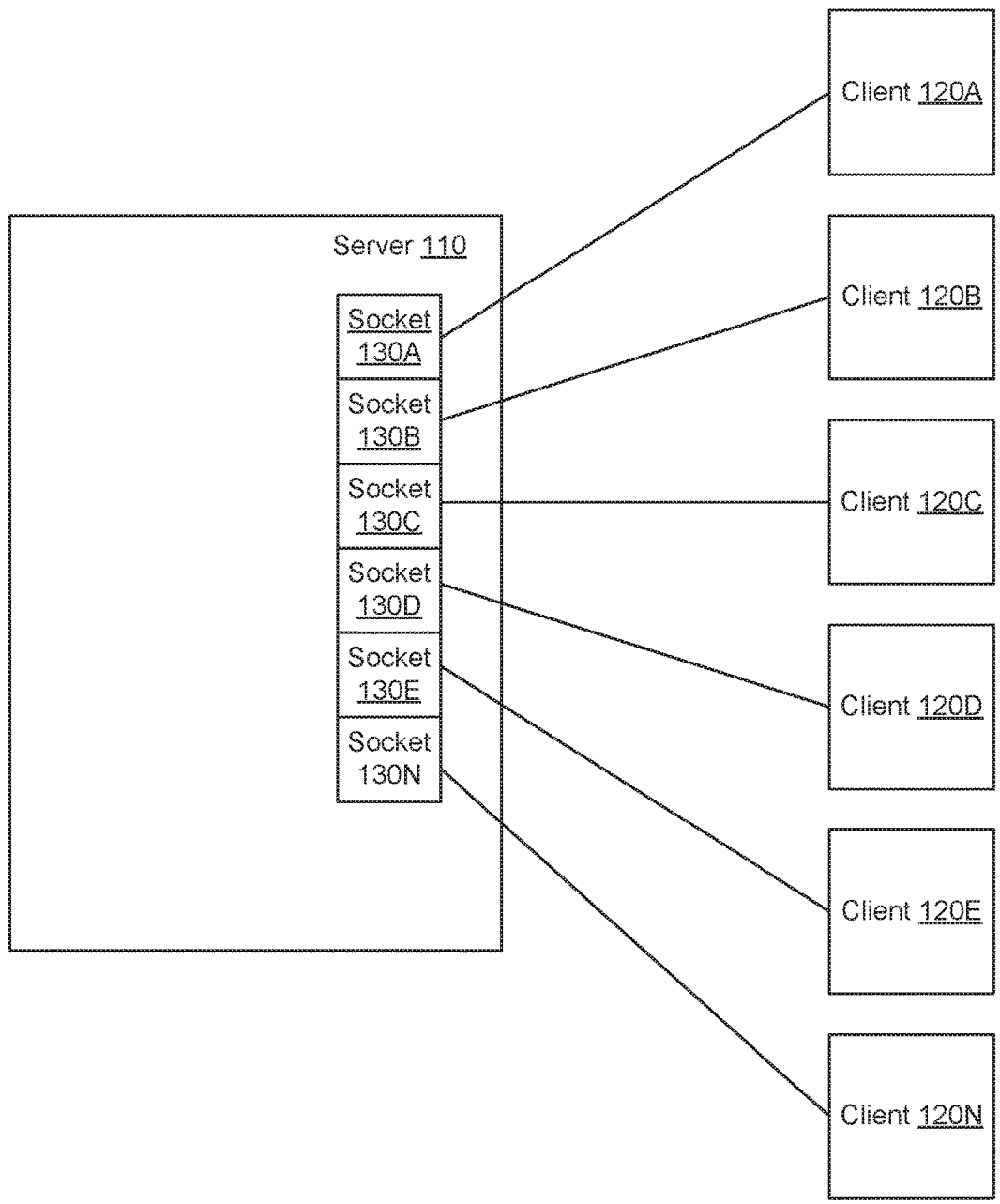
FIG. 1 schematically illustrates an example software component diagram in which the methods and systems described herein may be implemented.

Described herein are systems and methods for improving the efficiency of asynchronous input/output (I/O) operations.

A process running on a computer system may receive data from multiple sources and/or send data to multiple destinations. Conceptually, means for implementing these I/O operations may be represented by an abstract model of a communication channel (e.g., implemented by a TCP connection or a sequence of UDP datagrams) which on both sides is terminated by communication endpoints (referred to as sockets). A socket, addressable by a file descriptor, may be utilized for receiving and/or transmitting data.

Since it is often impractical to require the communicating parties to perform I/O operations synchronously (i.e., requiring the first party to immediately read the data that has just been written to the communication channel by the second party), various schemes may be implemented for facilitating the asynchronous mode of performing I/O operations by the communicating parties. In an illustrative example, buffering the data on both sides of a communication channel would allow the communicating parties to perform the I/O operations asynchronously with respect to each other, to the extent allowed by the sizes of the respective buffers: the first communicating party may write to a socket independently of the second party's reading from the second socket representing the other end of the communication channel, to the extent that the data being written may be buffered on either size of the communication channel; conversely, the other party may read from the symmetric socket the previously buffered data. However, when the input buffer becomes empty or the output buffer overflows, the corresponding I/O operation (read or write, respectively) would either return an error or block until the incoming data is available or the output buffer clears. The blocking or non-blocking mode of a socket may be specified by a parameter of the system call employed for creating the socket.

In practice, various computer programs may receive and service multiple incoming requests, e.g., a Hypertext Transfer Protocol (HTTP) server receiving and servicing HTTP requests, an application server receiving an application layer requests, a database server receiving database access requests, etc. In all these and many other situations, implementing the I/O operations in the blocking mode (i.e., when the I/O operations blocks until the incoming data is available or the output buffer clears) may be impractical, unless servicing every data source and destination is implemented by a dedicated processing thread. Such multi-threading, while allowing other threads to process while some threads may be waiting on I/O operations, may require a complex thread coordination and communication mechanism, which may represent a substantive computational power overhead. Conversely, implementing the I/O operations in the non-blocking mode would involve creating polling loops representing significant performance overhead.

In common implementations, the issue is to some extent alleviated by Posix® select( ) system call, which receives a list of socket descriptors and a timeout value and returns when either at least one socket is ready for performing I/O operations (receiving and/or transmitting data) or the timeout has expired. If at least one socket is ready, select( ) returns the corresponding completion code and the list of sockets that are ready for performing I/O operations. Alternatively, poll( ) system call, which provides similar functionality, may be used.

However, performance of select( ) and poll( ) system calls linearly depends on the number of sockets to monitor. Therefore, using select( ) or poll( ) may represent a substantial impediment to implementing highly-scalable servers servicing large numbers of client connections.

The present disclosure addresses the above-noted and other deficiencies by providing systems and methods for performing asynchronous I/O operations while limiting, to the extent allowed by the actual rate of I/O operations, the number of sockets to be monitored at each iteration of the method, based on their observed performance in the previous iterations, in order to yield a better than the linear dependency of the computational complexity of I/O operations on the number of sockets being serviced, as described in more detail herein below.

In an illustrative example, a server communicating with one or more clients via multiple sockets may produce a list of sockets that are ready for performing I/O operations (i.e., have incoming data available or able to accept outgoing data). Such a list may be produced by invoking select( ) or poll( ) system call. Provided that select( ) or poll( ) returns at least one ready socket, the server may iterate over the list. At each iteration, the server may perform the I/O operations with respect to the ready sockets and may refresh the list by adding and/or removing at least some sockets based on their performance observed in one or more previous iterations, so that the updated list of sockets would include the sockets that are likely to be ready for performing I/O operations (i.e., have incoming data available or able to accept outgoing data) during the next iteration of the method. Upon receiving at least a threshold number of "socket not ready" errors, the method may loop back to producing the list of ready sockets by invoking select( ) or poll( ) system call.

The methods described herein may be employed by various servers, such as application servers, HTTP servers, database servers, and/or servers implementing virtualized execution environments, for efficiently servicing multiple incoming requests initiated by multiple clients. In an illustrative example, a virtualized execution environment may be implemented by a multi-user terminal server (also referred to as "remote desktop server"). In another illustrative example, a virtualized execution environment may be implemented by a virtual desktop interface (VDI) agent running on a host computer system executing one or more virtual machines that are managed by a hypervisor (e.g., Hyper-V®, VMware®, or Xen®). In yet another illustrative example, a virtualized execution environment may be implemented by a guest agent installed in a guest operating system of a virtual machine running on a host computer system. In yet another illustrative example, a virtualized execution environment may be implemented by a remote personal computer (PC) agent running on a personal computer system.

The systems and methods described herein may be implemented by hardware (e.g., general purpose and/or specialized processing devices, and/or other devices and associated circuitry), software (e.g., instructions executable by a processing device), or a combination thereof. Various aspects of the above referenced methods and systems are described in detail herein below by way of examples, rather than by way of limitation.

FIG. 1 schematically illustrates an example software component diagram in which the methods and systems described herein may be implemented. At least some of the software components illustrated in FIG. 1 may run on a dedicated hardware platform (such as the example computer system 1000 of FIG. 6) or in a dedicated virtual execution environment (such as a virtual machine, an application container, or a remote access session), while other software components illustrated in FIG. 1 may share a hardware platform (such as the example computer system 1000 of FIG. 6) or a virtual execution environment. Various additional components and/or methods of their interconnection may be omitted from FIG. 1 for clarity and conciseness.

As schematically illustrated by FIG. 1, the server 110 may communicate with one or more clients 120A-120Z. It should be noted that the "client" and "server" designations here are purely functional, since an executable process may act as a server with respect to another executable process, and may, at the same time, act as a client with respect to a third executable process. In an illustrative example, the client and the server may be running on two different hardware platforms or two different virtual execution environments. Alternatively, both the client and the server processes may be running on the same hardware platform or the same virtual execution environment. In various illustrative examples, the server 110 may represent an HTTP server receiving and servicing HTTP requests, an application server receiving an application layer requests, a database server receiving database access requests, a virtualization server implementing a virtual execution environment (such as a virtual machine, an application container, or a remote access session), etc.

The server 110 may create multiple sockets 130A-130N for communicating to the clients 120A-120Z, such that each socket 130 is identified by the combination of a network address, a port, and a transport layer protocol (e.g., TCP or UDP). The server 110 may utilize one or more sockets for reading the incoming data received from the corresponding client 120 and/or writing the outgoing data for transmission to client 120.

In certain implementations, the server 110 may perform I/O operations (receiving and/or transmitting data) asynchronously with respect to I/O operations performed by the respective clients 120A-120Z, while limiting, to the extent allowed by the actual rate of I/O operations, the number of sockets to be monitored at each iteration of the method. In an illustrative example, the server may initialize a list of sockets that are ready for performing I/O operations (i.e., have incoming data available or able to accept outgoing data). Such a list may be produced by invoking select( ) or poll( ) system call. Provided that select( ) or poll( ) returns at least one ready socket, the server may iterate over the list. For each socket, the server may store a corresponding state flag which may be set or cleared to indicate the socket ready state. Accordingly, all the sockets on the initial list may have their respective state flags set to indicate the socket ready state.

At each iteration, the server may perform the I/O operations with respect to the ready sockets and may, for each socket, update the socket state and its I/O performance statistics. In particular, if a socket has returned a not ready error, its state flag may be cleared to indicate the socket not ready state. Upon traversing the list, the server may refresh the list by adding and/or removing at least some sockets based on their performance observed in one or more previous iterations, so that the updated list of sockets would include the sockets that are likely to be ready for performing I/O operations (i.e., have incoming data available or able to accept outgoing data) during the next iteration of the method. Upon receiving at least a threshold number of "socket not ready" errors, the method may loop back to producing the list of ready sockets by invoking select( ) or poll( ) system call. The threshold number of errors may be pre-determined (e.g., specified as a parameter of the method) or dynamically updated based on the observed I/O performance of the sockets.

As noted herein above, refreshing the list of sockets at each iteration may involve adding and/or removing at least some sockets based on their state and I/O performance observed in one or more previous iterations. In an illustrative example, a socket whose state flag is set to "not ready" (e.g., if the socket returned a "not ready" error during the last iteration) may be removed from the list, so that at the next iteration there will be no attempt to send and/or receive data using that socket. In another illustrative example, based on its past I/O performance, a socket which has been removed from the list of ready sockets may be marked for inclusion into the list upon expiration of a certain period of time or upon performing a certain number of list iterations.

In order to predict the socket ready state, the server may maintain a memory data structure for storing, for each socket, its state and one or more statistics characterizing the observed I/O performance of the socket. As schematically illustrated by FIG. 2, the data structure may be represented by a matrix 200 including a plurality of vectors 210A-210N, such that each vector 210 corresponds to a socket 130 of a plurality of sockets 130A-130N of FIG. 1. Each vector 210 may include the socket state 220 and one or more values of the I/O performance statistics, such as the auto-incrementing timer value 230 which is reset to zero every time an I/O operation is performed with respect to the socket. In another illustrative example, the vector 210 may include the value 240 reflecting the amount of data that has been received or transmitted via the socket since the last iteration over the list of ready sockets. In another an illustrative example, the vector 210 may include a value 250 reflecting the socket I/O rate (i.e., the amount of data received or transmitted within a unit of time), which may be updated at every iteration over the list of ready sockets.

Based on these and other statistics maintained for a particular socket, the server may, under the assumption that the observed performance pattern of the socket will not significantly change, predict when the socket is likely to be ready for performing the I/O operations. In an illustrative example, the server may extrapolate the observed socket performance in order to predict the time period to elapse (or the number of iterations to be performed) before the socket will have at least a threshold amount of data available. The extrapolation may be performed based on the observed I/O data rate of the socket, which, in turn, can be estimated using the amount of data received/transmitted by the socket and the timer value. The threshold amount of data may be pre-determined (e.g., specified as a parameter of the method) or may be dynamically updated in course of performing the iterations, e.g., based on performance of the given socket and/or other sockets. The calculated value of the time period to elapse (or the number of iterations to be performed) before the socket will have at least a threshold amount of data available may be stored in the above-referenced memory data structure maintained by the server for each socket. In an illustrative example, the stored timer value or the counter of iterations may be decremented at every iteration, and when the timer value or the counter reaches zero, the corresponding socket may be included into the list of ready sockets to be serviced by the next iteration of the method. In other implementations of the method, various other statistics and extrapolation methods may be utilized.

The server may utilize the data produced by performing I/O operations (e.g., the data received from one or more clients) for updating an application state and producing a response to be transmitted back to the respective clients. In an illustrative example, the server may implement a virtual execution environment (such as a virtual machine, an application container, or a remote access session), and may utilize the data received from one or more clients to update the state of the virtual execution environment and transmit, to the respective clients, one or more responses reflecting the updated state of the virtual execution environment. In another illustrative example, the server may implement an application server, and may utilize the data received from one or more clients to update the application state and transmit, to the respective clients, one or more responses reflecting the updated application state.

Figure 3:
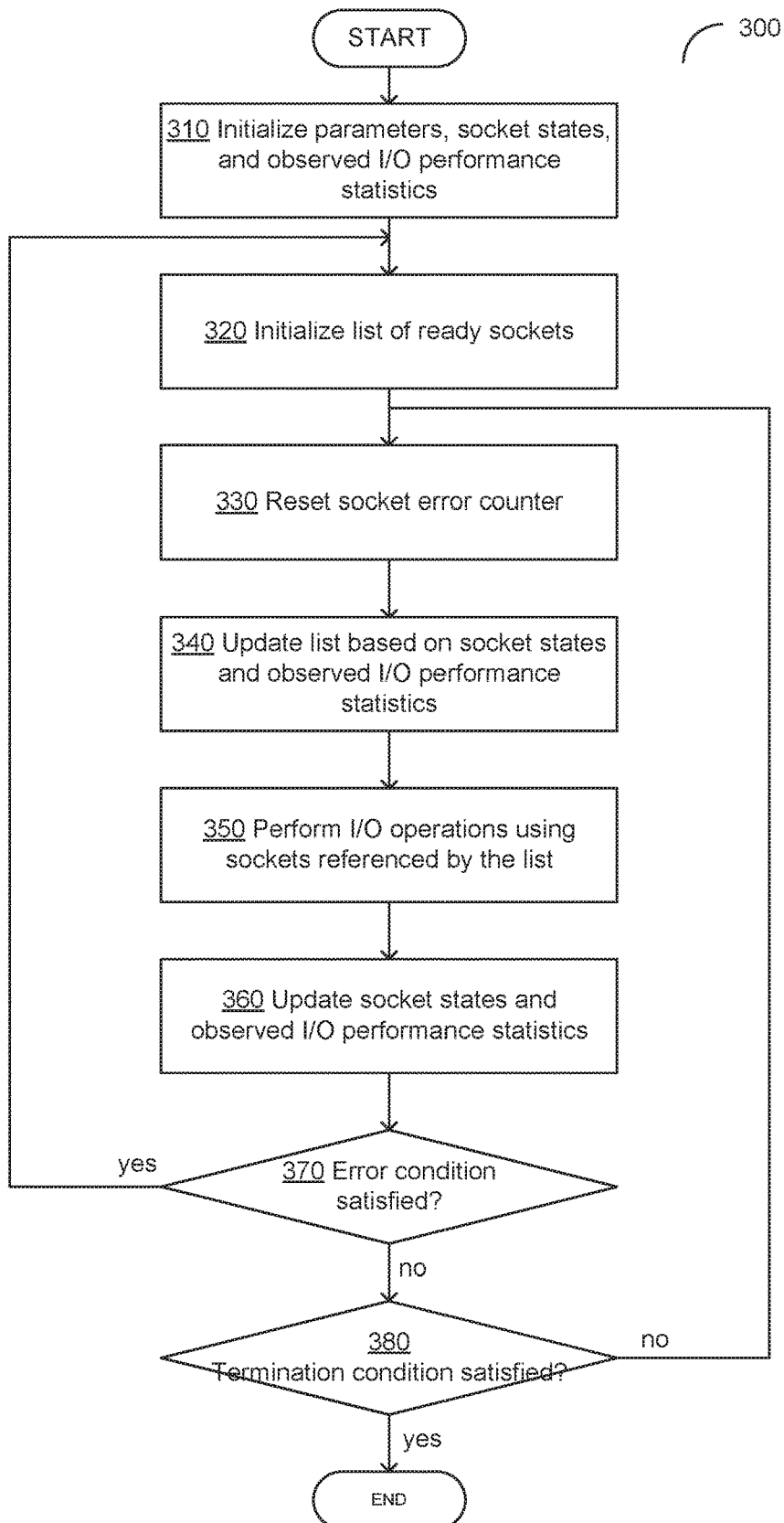
FIG. 3 depicts a flow diagram of an example method of performing asynchronous input/output operations, in accordance with one or more aspects of the present disclosure.

FIG. 3 depicts a flow diagram of one illustrative example of method 300 of performing asynchronous input/output operations, which may be performed by a server operating in accordance with one or more aspects of the present disclosure. Method 300 and/or each of its individual functions, routines, subroutines, or operations may be performed by one or more processors of the computer system (e.g., the server 110 of FIG. 1) implementing the method. In certain implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processing threads implementing method 300 may be executed asynchronously with respect to each other.

At block 310, the server implementing the method may initialize the method parameters, socket states, and observed I/O performance statistics for a plurality of sockets.

At block 320, the server may initialize a list of ready sockets. In an illustrative example, initializing the list may involve invoking select( ) or poll( ) system call. Provided that select( ) or poll( ) returns at least one ready socket, the processing may continue at block 340, otherwise, the method may repeat the operations of block 320 (the loop is not shown in FIG. 3 for clarity and conciseness).

At block 330, the server may, in preparation for the next iteration of traversing the socket list, reset the socket error counter indicating the number or I/O errors produced by the sockets in a respective iteration of the method.

At block 340, the server may update the socket list based on the socket states and I/O performance statistics exhibited by the sockets in the previous iteration of the method, so that the updated list of sockets would include the sockets that are likely to be ready for performing I/O operations (i.e., have incoming data available or able to accept outgoing data) during the next iteration of the method. Updating the list may involve predicting the state of a particular socket during the next iteration of the method, i.e., predicting whether or not the socket will be ready for performing the I/O operations. In an illustrative example, the server may extrapolate the observed socket performance in order to predict the time period to elapse (or the number of iterations to be performed) before the socket will have at least a threshold amount of data available. The extrapolation may be performed based on the observed I/O data rate of the socket, which, in turn, can be estimated using the amount of data received/transmitted by the socket and the timer value, as described in more detail herein above.

Figure 4:
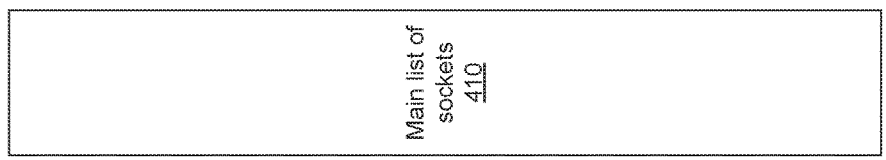
FIG. 4 schematically illustrates adding and/or removing sockets to the main list of sockets performed by auxiliary processing threads operating in parallel with the main processing thread, in accordance with one or more aspects of the present disclosure.
Figure 4:
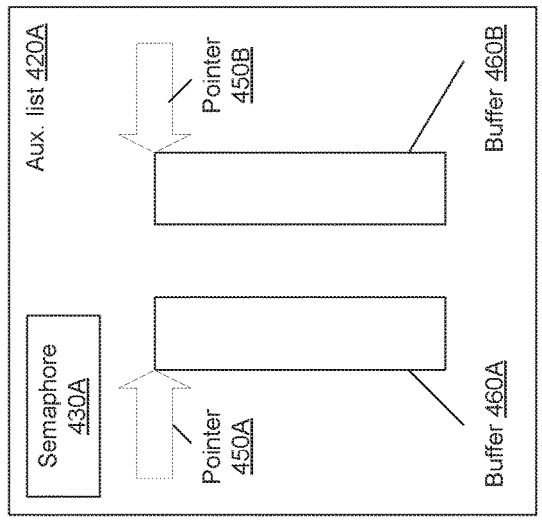
Figure 4:
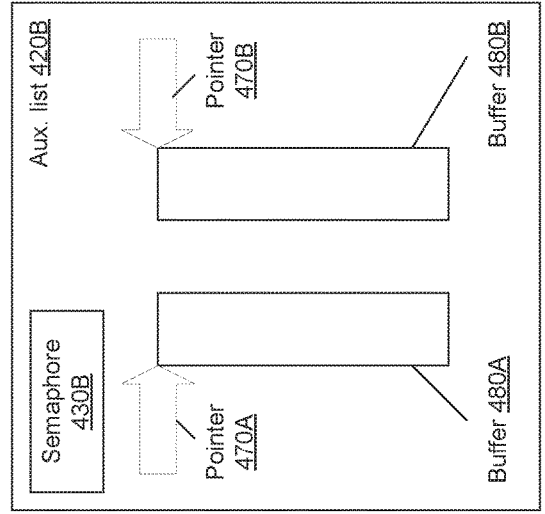

In certain implementations, operations of adding and/or removing sockets to the list may be performed by multiple auxiliary processing threads operating in parallel with the main processing thread which implements the method 300, as schematically illustrated by FIG. 4. Sockets being added or removed to the main list 410 for processing by the main thread of the method 300 may initially be placed into two auxiliary lists, i.e., a list 420A of sockets being added to the main list and a list 420B of sockets being removed from the main list. Since the auxiliary lists 420 are updated by multiple processing threads, access to those lists may be synchronized, e.g., by respective semaphores 430A-430B or other synchronization mechanisms. An auxiliary processing thread may acquire a semaphore 430 associated with one of the auxiliary lists 420, add one or more socket identifiers to the auxiliary list 420, and release the previously acquired semaphore 430.

In order to minimize the time of holding the semaphores associated with the auxiliary lists, the main processing thread may employ buffer swapping for processing the auxiliary lists, by allocating a pair of buffers for each of the two auxiliary lists, and swapping the pointer to the head of the auxiliary list with the pointer to its corresponding paired buffer every time when the content of an auxiliary list needs to be copied to the main list 410, thus only holding the associated semaphore 430 for the duration of the pointer swapping operation. In an illustrative example, for appending to the main list 410 the sockets specified by the auxiliary list 420A, the main processing thread may acquire the semaphore 430A which synchronizes access to the auxiliary list 420A of the sockets to be added to the main list 410. Responsive to successfully acquiring the semaphore 430A, the main processing thread may swap the pointers 450A and 450B pointing to the respective buffers 460A-460B and then release the semaphore 430A, thus allowing the auxiliary processing threads to proceed filling the auxiliary list 420A (which is now provided by the buffer 460B), with identifiers of sockets to be added to the main list 410. Upon releasing the semaphore 430A, the main processing thread may copy the contents of the buffer 460A to the main list of sockets 410, and proceed to perform the operations referenced by block 350 of FIG. 3.

Similarly, for removing sockets specified by the auxiliary list 420B from the main list 410, the main processing thread may acquire the semaphore 430B which synchronizes access to the auxiliary list 420B of the sockets to be removed from the main list 410. Responsive to successfully acquiring the semaphore 430B, the main processing thread may swap the pointers 470A and 470B and then release the semaphore 430B, thus allowing the auxiliary processing threads to proceed filling the auxiliary list, which is now provided by the buffer 480B, with identifiers of sockets to be removed from the main list 410. Upon releasing the semaphore 430B, the main processing thread may remove, from the main list 410, the sockets identified by the contents of the buffer 480A, and proceed to perform the operations referenced by block 350 of FIG. 3.

Referring again to FIG. 3, at block 350, the server may perform I/O operations (such as read and/or write operations) for the sockets referenced by the socket list, as described in more detail herein above.

Performing the I/O operations may involve, as schematically shown by block 360, updating the socket states and observer performance statistics. In particular, if a socket has returned a not ready error, its state flag may be cleared to indicate the socket not ready state. The I/O performance statistics may include such an auto-incrementing timer value which is reset to zero every time an I/O operation is performed with respect to the socket, the amount of data that has been received or transmitted via the socket since the last iteration over the list of ready sockets, and/or the socket I/O rate (i.e., the amount of data received or transmitted within a unit of time), as described in more detail herein above.

Responsive to determining, at block 370, that a predetermined or dynamically configurable error condition has been satisfied, the method may loop back to block 320 for re-initializing the list of ready sockets; otherwise, the processing may continue at block 380. In an illustrative example, evaluating the error condition may involve determining whether at least a threshold number of "socket not ready" errors have been received, as described in more detail herein above.

Responsive to determining, at block 380, that a predetermined or dynamically configurable termination condition has been satisfied, the method may terminate; otherwise, the method may loop back to block 330 for performing the next iteration of traversing the list of ready sockets, as described in more detail herein above.

Figure 5:
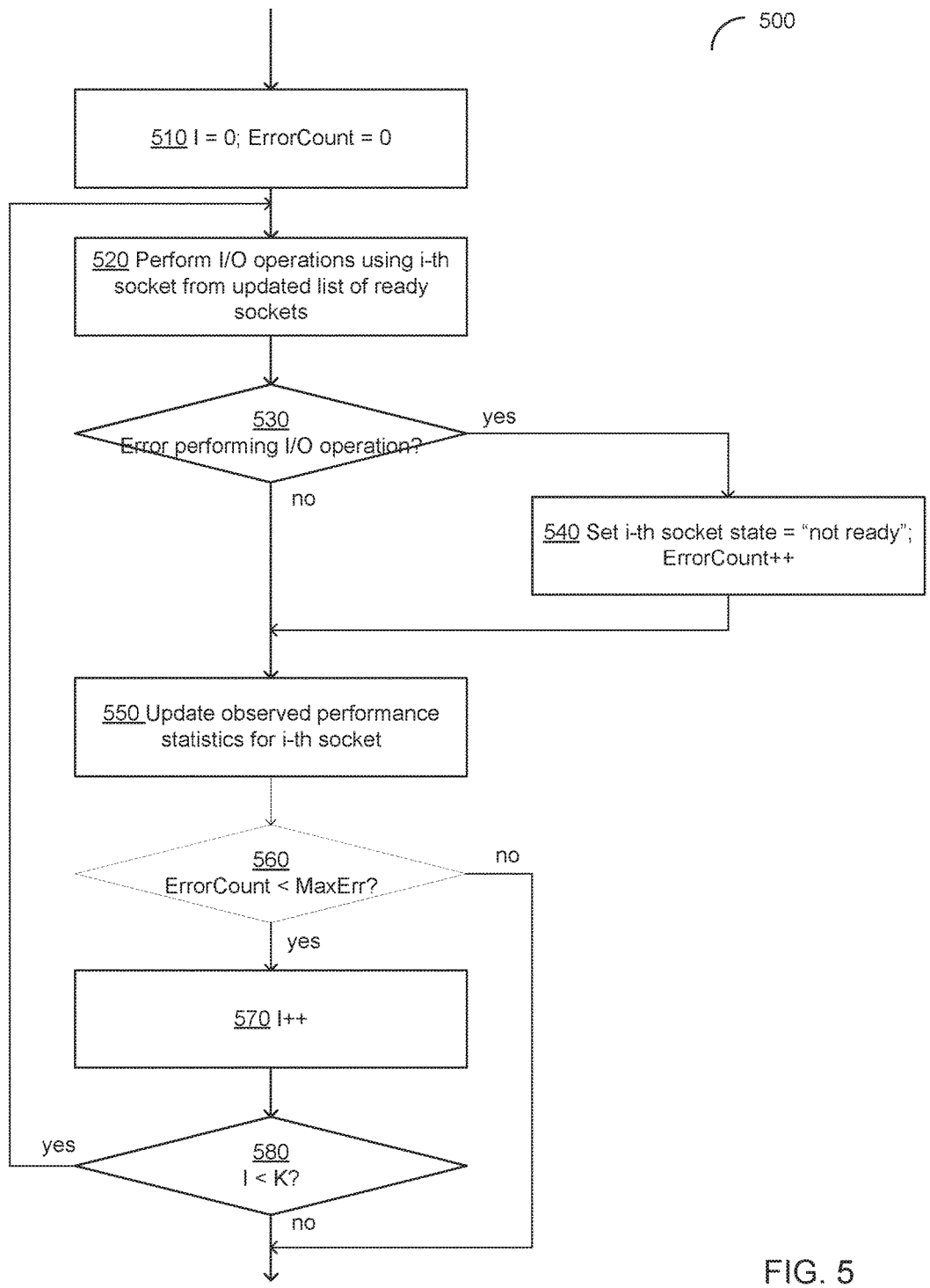
FIG. 5 depicts a flow diagram of one illustrative example of method of traversing a list of sockets, which may be performed by a server operating in accordance with one or more aspects of the present disclosure.

FIG. 5 depicts a flow diagram of one illustrative example of method 500 of traversing a list of sockets, which may be performed by a server operating in accordance with one or more aspects of the present disclosure. Method 500 implements operations referenced by the blocks 350-360 FIG. 3. Method 500 and/or each of its individual functions, routines, subroutines, or operations may be performed by one or more processors of the computer system (e.g., the server 110 of FIG. 1) implementing the method. In certain implementations, method 500 may be performed by a single processing thread. Alternatively, method 500 may be performed by two or more processing threads, each thread executing one or more individual functions, routines, subroutines, or operations of the method. In an illustrative example, the processing threads implementing method 500 may be synchronized (e.g., using semaphores, critical sections, and/or other thread synchronization mechanisms). Alternatively, the processing threads implementing method 500 may be executed asynchronously with respect to each other.

At block 510, the server implementing the method may initialize a pointer to the list of sockets and the initialize an error counter to count the number of sockets retuning "socket not ready" or other pre-defined types of errors. In an illustrative example, the list of sockets may be produced by operations of block 350 of FIG. 3, and may include identifiers of sockets that are likely to be ready for performing I/O operations (i.e., have incoming data available or able to accept outgoing data).

At block 520, the server may perform I/O operations (such as read and/or write operations) using the socket identified by the pointer.

Responsive to detecting, at block 530, an I/O error (such as "socket not ready" or other pre-defined type of error), the server may, at block 540, increment the error counter and clear the socket state flag to reflect the "socket not ready" state.

At block 550, the server may update the I/O performance statistics associated with the socket, e.g., an auto-incrementing timer value which is reset to zero every time an I/O operation is performed with respect to the socket, the amount of data that has been received or transmitted via the socket since the last iteration over the list of ready sockets, and/or the socket I/O rate (i.e., the amount of data received or transmitted within a unit of time), as described in more detail herein above.

Responsive to determining, at block 560, that the error counter value is less than a pre-defined threshold number of socket errors, the processing may continue at block 570; otherwise, the method may terminate (e.g., by returning execution control to method 300 of FIG. 3).

At block 570, the server may increment the pointer to the list of sockets.

Responsive to determining, at block 580, that the list of sockets has not yet been exhausted, the method may loop back to block 520; otherwise, the method may terminate (e.g., by returning execution control to method 300 of FIG. 3).

Figure 6:
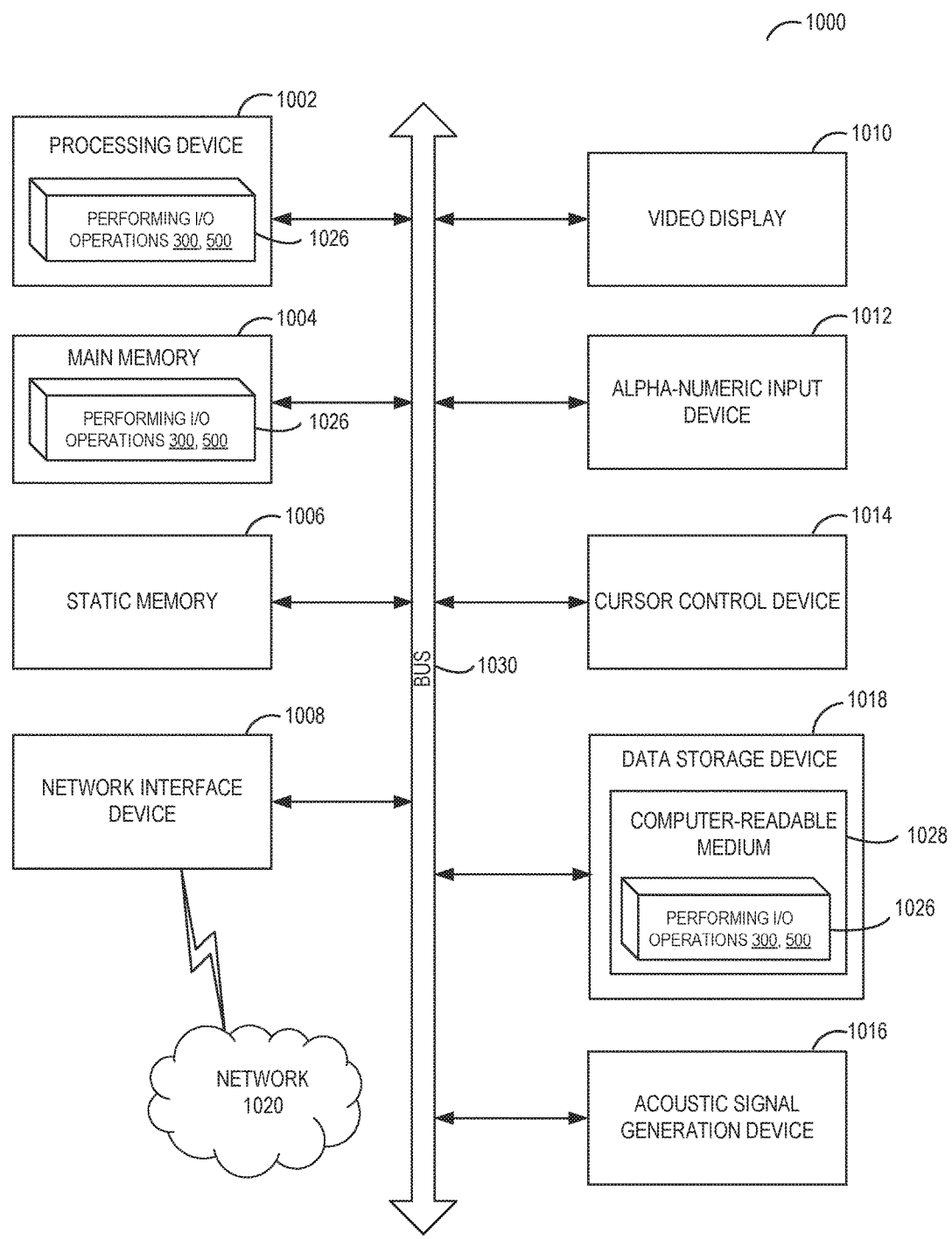
FIG. 6 depicts a block diagram of an example computer system operating in accordance with one or more aspects of the present disclosure.

FIG. 6 schematically illustrates a component diagram of an example computer system 1000 which may perform any one or more of the methods described herein. In various illustrative examples, computer system 1000 may represent the remote application server 110, client gateway 135, and/or client device 140 of FIG. 1.

Example computer system 1000 may be connected to other computer systems in a LAN, an intranet, an extranet, and/or the Internet. Computer system 1000 may operate in the capacity of a server in a client-server network environment. Computer system 1000 may be a personal computer (PC), a set-top box (STB), a server, a network router, switch or bridge, or any device capable of executing a set of instructions (sequential or otherwise) that specify actions to be taken by that device. Further, while only a single example computer system is illustrated, the term "computer" shall also be taken to include any collection of computers that individually or jointly execute a set (or multiple sets) of instructions to perform any one or more of the methods discussed herein.

Example computer system 1000 may comprise a processing device 1002 (also referred to as a processor or CPU), a main memory 1004 (e.g., read-only memory (ROM), flash memory, dynamic random access memory (DRAM) such as synchronous DRAM (SDRAM), etc.), a static memory 1006 (e.g., flash memory, static random access memory (SRAM), etc.), and a secondary memory (e.g., a data storage device 1018), which may communicate with each other via a bus 1030.

Processing device 1002 represents one or more general-purpose processing devices such as a microprocessor, central processing unit, or the like. More particularly, processing device 1002 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. In accordance with one or more aspects of the present disclosure, processing device 1002 may be configured to execute instructions implementing methods 300, 500 of performing asynchronous input/output operations.

Example computer system 1000 may further comprise a network interface device 1008, which may be communicatively coupled to a network 1020. Example computer system 1000 may further comprise a video display 1010 (e.g., a liquid crystal display (LCD), a touch screen, or a cathode ray tube (CRT)), an alphanumeric input device 1012 (e.g., a keyboard), a cursor control device 1014 (e.g., a mouse), and an acoustic signal generation device 1016 (e.g., a speaker).

Data storage device 1018 may include a computer-readable storage medium (or more specifically a non-transitory computer-readable storage medium) 1028 on which is stored one or more sets of executable instructions 1026. In accordance with one or more aspects of the present disclosure, executable instructions 1026 may comprise executable instructions encoding various functions of methods 300, 500 of performing asynchronous input/output operations.

Executable instructions 1026 may also reside, completely or at least partially, within main memory 1004 and/or within processing device 1002 during execution thereof by example computer system 1000, main memory 1004 and processing device 1002 also constituting computer-readable storage media. Executable instructions 1026 may further be transmitted or received over a network via network interface device 1008.

While computer-readable storage medium 1028 is shown in FIG. 6 as a single medium, the term "computer-readable storage medium" should be taken to include a single medium or multiple media (e.g., a centralized or distributed database, and/or associated caches and servers) that store the one or more sets of VM operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages may be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method, comprising:
   initializing a list of sockets that are ready for performing input/output (I/O) operations;
   traversing the list of sockets, wherein a traversal operation of the list includes, for each socket referenced by the list:
      performing I/O operations using the socket,
      updating a state flag associated with the socket to reflect a state of the socket,
      updating one or more observed I/O performance statistics of the socket; and
   responsive to detecting less than a threshold number of I/O operation errors during the traversal operation, updating the list of sockets based on updated state flags and observed I/O performance statistics.

2. The method of claim 1, further comprising:
   responsive to updating the list of sockets, performing a next traversal operation.

3. The method of claim 1, wherein the I/O operations include at least one of: a read operation or a write operation.

4. The method of claim 1, wherein the observed I/O performance statistics include an I/O data rate exhibited by the socket.

5. The method of claim 1, wherein the observed I/O performance statistics include at least one of: an amount of data received via the socket or an amount of data transmitted via the socket.

6. The method of claim 1, wherein updating the list of sockets further comprises: removing, from the list, at least one socket having a state flag indicating a "not ready" state.

7. The method of claim 1, wherein updating the list of sockets further comprises: adding, to the list, at least one socket based on a predicted I/O performance of the socket.

8. The method of claim 1, wherein updating the list of sockets further comprises: adding, to the list, at least one socket based on extrapolating an observed I/O data rate exhibited by the socket.

9. The method of claim 1, further comprising:
   utilizing data produced by performing I/O operations for implementing at least an application server or a virtualized execution environment.

10. A system, comprising:
    a memory; and
    a processor, coupled to the memory, the processor configured to:
       initialize a list of sockets that are ready for performing input/output (I/O) operations;
       traverse the list of sockets, wherein a traversal operation of the list includes, for each socket referenced by the list:
          performing I/O operations using the socket,
          updating a state flag associated with the socket to reflect a state of the socket,
          updating one or more observed I/O performance statistics of the socket; and
       responsive to detecting less than a threshold number of I/O operation errors during the traversal operation, update the list of sockets based on updated state flags and observed I/O performance statistics.

11. The system of claim 10, wherein the processor is further configured to:
    responsive to updating the list of sockets, perform a next traversal operation.

12. The system of claim 10, wherein updating the list of sockets further comprises: removing, from the list, at least one socket having a state flag indicating a "not ready" state.

13. The system of claim 10, wherein updating the list of sockets further comprises: adding, to the list, at least one socket based on a predicted I/O performance of the socket.

14. The system of claim 10, wherein updating the list of sockets further comprises: adding, to the list, at least one socket based on extrapolating an observed I/O data rate exhibited by the socket.

15. The system of claim 10, wherein the processor is further configured to:
    utilize data produced by performing I/O operations for implementing at least an application server or a virtualized execution environment.

16. A non-transitory computer-readable storage medium comprising executable instructions that, when executed by a processor, cause the processor to:
    initialize a list of file descriptors that are ready for performing input/output (I/O) operations;
    traverse the list of file descriptors, wherein a traversal operation of the list includes, for each file descriptor referenced by the list:
       performing I/O operations using the file descriptor, and
       updating a state flag associated with the file descriptor to reflect a state of the file descriptor,
       updating one or more observed I/O performance statistics of the file descriptor; and
    responsive to detecting less than a threshold number of I/O operation errors during the traversal operation, update the list of file descriptors based on updated state flags and observed I/O performance statistics.

17. The non-transitory computer-readable storage medium of claim 16, wherein the file descriptor represents a socket.

18. The non-transitory computer-readable storage medium of claim 16, further comprising executable instructions that, when executed by the processor, cause the processor to:
    responsive to updating the list of file descriptors, perform a next traversal operation.

19. The non-transitory computer-readable storage medium of claim 16, wherein the observed I/O performance statistics include at least one of: an I/O data rate exhibited by the file descriptor, an amount of data received via the file descriptor or an amount of data transmitted via the file descriptor.

20. The non-transitory computer-readable storage medium of claim 16, wherein updating the list of file descriptors further comprises: removing, from the list, at least one file descriptor having a state flag indicating a "not ready" state.

* * * * *